UNITED STATES PATENT OFFICE.

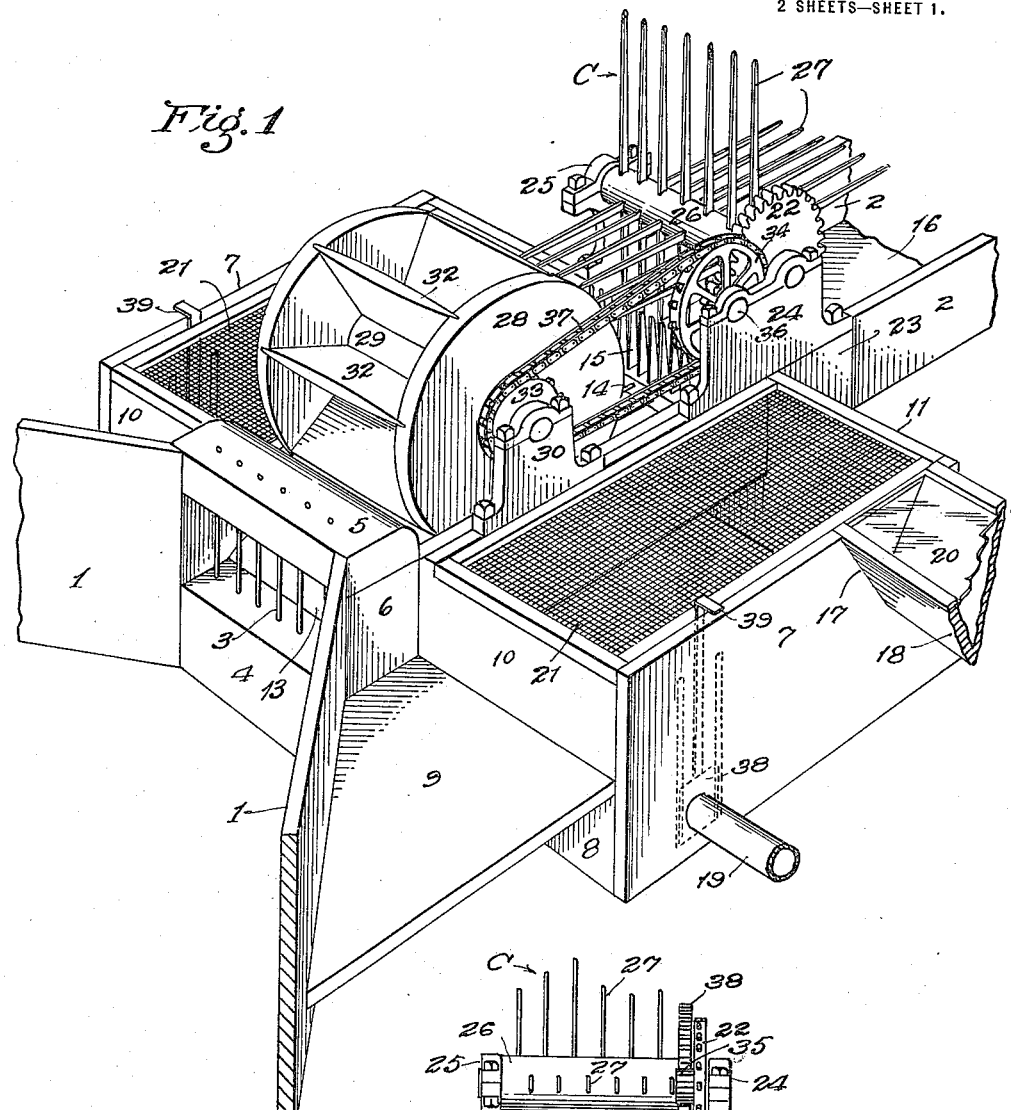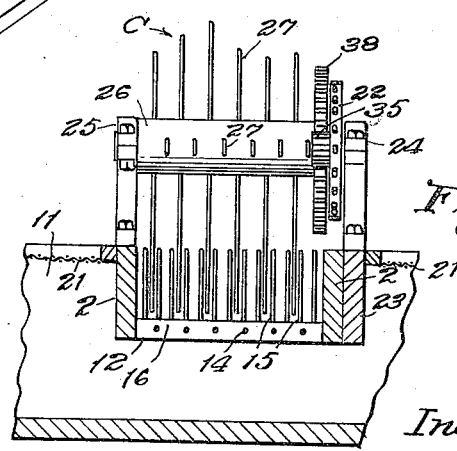

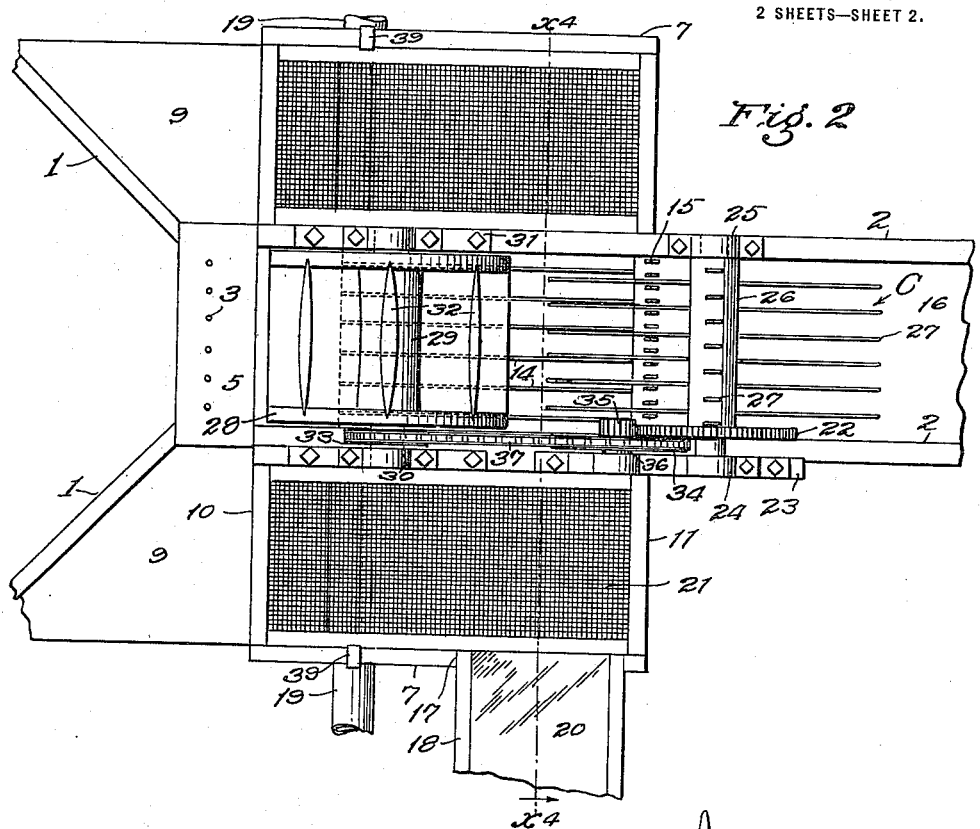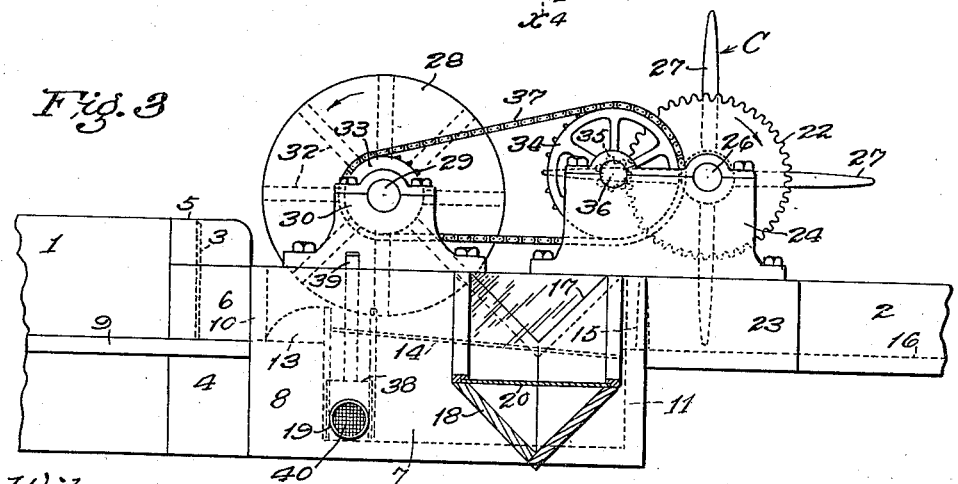

ROBERT MATHESON, OF LOS ANGELES, CALIFORNIA, ASSIGNOR OF ONE-HALF TO JOHN A. BEACH, OF LOS ANGELES, CALIFORNIA.

APPARATUS FOR KEEPING FISH OUT OF IRRIGATING-DITCHES.

1,150,445.   Specification of Letters Patent.   Patented Aug. 17, 1915.

Application filed December 10, 1913. Serial No. 806,112.

*To all whom it may concern:*

Be it known that I, ROBERT MATHESON, a citizen of the United States, residing at Los Angeles, in the county of Los Angeles and State of California, have invented a new and useful Apparatus for Keeping Fish Out of Irrigating-Ditches, of which the following is a specification.

This invention relates to devices for keeping trout out of irrigating ditches in which device a grated entrance is used.

An object of the invention is to provide a device for positively keeping trout and other fishes out of irrigating ditches without injury to the fish, and which will at the same time be free from the liability of being clogged up by objectionable matter, such as leaves, twigs, and the like, that are being carried by the stream.

A further object of the invention is to provide a device that will automatically maintain itself free from objectionable matter.

A feature of this invention is to utilize the power of the water flowing into said ditch to drive mechanism for freeing the device from foreign material.

Another object is to make provision for freeing the water flowing in an irrigation ditch or channel from all fish and for conveying and returning all of such fish to the original stream.

The important features, capabilities and advantages of this invention will become apparent from the detailed subjoined description of one specific embodiment thereof.

The accompanying drawings illustrate the invention.

Figure 1 is a perspective view of the apparatus installed at the entrance of an irrigating ditch for preventing the trout from entering the ditch. Fig. 2 is a plan of the same. Fig. 3 is an elevation of the same. Fig. 4 is a fragmentary elevation on line $x^4-x^4$ of Fig. 2.

In the embodiment shown two deflecting walls 1 are illustrated as extending into a natural stream of water to form the mouth or inlet for the channel of an irrigating ditch, the side walls 2 of which extend rearwardly from each rear end of said deflecting walls 1. The entrance at the rear end of the deflecting walls 1 is grated by vertical bars 3 which are securely fixed between the lower supporting block 4 and the upper supporting member 5 which is suitably supported on end members 6. The bars 3 serve to prevent large obstacles from entering the irrigating ditch. A trough-like construction is provided immediately behind the entrance and extends a certain distance below the upper surface of the lower supporting block 4. This trough has two side walls 7 parallel to the side walls 2 of the irrigating channel. Directly back of the supporting block 4 is located a transverse beam 8 extending from the lower portion of one side wall 7 clear across the trough to the lower portion of the other side wall 7. To brace the deflecting walls 1 there is provided for each deflecting wall a bracing member 9 which fastens each deflecting wall 1 to one end of the transverse beam 8. Above each bracing member is provided a front wall 10 which extends from its respective side wall 7 to its oppositely disposed side wall 2 of the irrigating channel. A rear wall 11 for the trough extends from one wall 7 to the other wall 7 and is provided with a recess 12 for the irrigating channel to pass therethrough.

On the transverse beam 8 directly back of the bars 3 and extending across the entire entrance, a water deflector 13 is provided which has a convex face in front of a rear vertical face, so that water passing into the entrance will glide upward and then drop. The irrigating channel has its bottom open to the trough the full extent while it crosses said trough. From the vertical face of this deflector 13 to the portion of the rear wall 11 located between the sides 2 of the irrigating channel, bars 14 are provided to protect the fish from anglers while in the trough. The bars 3 and 14 are comparatively widely spaced from one another. Between the sides 2 of the irrigating channel and in line with the rear wall 11 of the trough a number of bars 15 are vertically fixed in the imperforate base or floor member 16 of the irrigating ditch, which base extends rearwardly from the rear wall 11. The bars 15 are positioned but a small distance from one another to prevent fish from entering the irrigating channel. The bottom of the trough is below the level of the irrigating channel so that the fish will not pile up in front of the bar but rather will be caused to pass downward and sideward to the exit 17. After the water is passed into the trough, and fish, such as trout, have entered which cannot continue into the irrigating ditch, it is desirable to remove the fish to the natural stream or to a pond. For this purpose, an unobstructed exit 17 is provided in one of the side walls 7 and the leader or channel 18 connected to the same, which channel 18 will have its outlet in the original stream or pond whereby the fish will be removed.

To pass out the sand or sediment which may be washed into the trough from the natural stream, a sand pipe 19 is provided at the lower end of the trough. In the present instance, two of these sand pipes are shown, one at each side of the trough. At the entrance to each sand pipe 19 from the trough is provided a gate 38 which is normally closed. When it is desired to clear out the sand pipe, the gate may be opened by any suitable means, such as a bar 39. At the entrance to the sand pipe from the trough may also be provided a permanent screen 40 to prevent fish from passing out through this sand pipe as they might be injured therein.

A covering 20, for instance, of glass may be provided for the leader 18 to prevent angling in the channel while at the same time permitting inspection of the leader. Furthermore, as the glass covering permits light to enter the leader 18, the fish will not hesitate to pass out through such leader. For the portions of the trough to each side of the sides 2 of the irrigating channel coverings 21, preferably made of screen or the like, are provided, also for the purpose of protecting the fish in the trough from anglers.

To keep the finer grated bars 15 clear from objectionable matter, there is provided a continually operating rotating comb C. A supporting member such as the beam 23 is secured alongside one of the side walls 2. A double bearing 24 and a single bearing 25 are provided, bearing 24 being mounted on said supporting beam 23 and bearing 25 on the side wall 2, which is on the other side of said irrigating channel, both supporting members being in position to rotatably support the shaft 26 having tines or fingers 27 adapted to pass through the spaces between the bars 15 to keep them clear of objectionable matter. The tines 27 are flat at their ends and arranged so that one of their edges will face forward in order that the bars 15 may be positioned as close to one another as possible. The tines 27 in the present instance are formed around said shaft 26 in four rows, the tines of each row being at right angles with the tines of the next row. The tines in each row are in staggered relation to the tines in the succeeding row, and the space between the adjacent tines is sufficient to accommodate between them a plurality of the bars 15, the arrangement being such that a certain row of tines 27 will pass through those spaces formed between the bars 15 through which the preceding row of tines did not pass. Of course, this arrangement of tines can be changed without departing from the broad scope of the invention. In the drawing the tines are spaced apart to accommodate the bars in sets of two. To drive this rotating comb, there is provided a water wheel 28 which is rotatably mounted on a shaft 29 in bearings 30 and 31, bearing 30 being positioned on the supporting beam 23, and bearing 31 being positioned on the other side of the irrigating channel on the upper edge of the side wall 2. The water wheel is stationed immediately behind the entrance and in position so that its vanes 32 will receive the fall of water formed by the deflecting member 13 to rotate the water wheel. Thus, so long as there is water entering the irrigating channel, the water wheel is operated.

The rotating comb is connected to be driven from the water wheel by any suitable means, such as a chain and sprocket arrangement now to be described. The rotating comb is preferably rotated at a very slow velocity. Therefore, the speed of the water wheel is geared down. A small sprocket wheel 33 is fixed to rotate with the water wheel. A large sprocket wheel 34 having a small spur wheel 35, fixed to rotate with it, is rotatably mounted on a stub shaft 36 supported in the front end of the bearing 24. The small sprocket wheel 33 and large sprocket wheel 34 are connected by the sprocket chain 37. The small spur wheel 35 is in mesh with the large pinion 38 fixed to rotate with the shaft 26. Thus, when the water wheel is rotated by the force of the entering water, it will rotate the rotating comb at a very reduced rate of speed, and consequent increased power, thus to avoid catching the fish and to insure removal of the rubbish from the bars 15.

The operation of the apparatus is as follows:—The water from the natural stream enters the mouth of the ditch between the deflecting walls 1. If there are any large obstacles carried by the stream they will be stopped by the bars 3. Finer objectionable floating matter that may enter and lodge against the more closely spaced apart bars 15 will be cleared away by the tines of the rotating comb which is continuously driven by the water wheel 28.

Obviously various changes and modifications may be made in the details of construction without departing from the general scope of the invention.

I claim:—

1. In combination, means forming a channel having an imperforate bottom, a grated entrance to said channel, a rotating comb having tines to pass between the bars of said grated entrance, said tines being of considerable length whereby they are capable of conveying fish, a trough extending transversely of said channel in front of said grated entrance and provided with an unobstructed exit, and a leader extending from said exit to carry fish out of said trough.

2. In combination, means forming a channel having an imperforate bottom, a grated entrance to said channel, a rotating comb having tines to pass between the bars of said grated entrance, said tines being of considerable length whereby they are capable of conveying fish, a trough extending transversely of said channel in front of said grated entrance, the bottom of said trough being at a lower level than the bottom of the channel and said trough having an unobstructed exit spaced apart from said bottom, and a leader extending from said exit to carry fish away from said trough.

3. In combination with an irrigating channel, an apparatus of the character described having means to prevent fish from entering the irrigating channel, a trough positioned in front of said means to receive the fish that swim against said first mentioned means, means for returning said fish to the natural stream, and means for passing off sand or sediment that may collect in the bottom of said trough.

4. In combination with an irrigating channel, an apparatus of the character described having means to prevent fish from entering the irrigating channel, a trough positioned in front of said means to receive the fish that swim against said first mentioned means, means for returning said fish to the natural stream, a sand pipe communicating with the bottom of said trough, and a gate for said sand pipe normally closing communication between said trough and said sand pipe and adapted to be opened when it is desired to remove the sand or sediment that may collect in said trough.

5. In combination with an irrigating channel, an apparatus of the character described having means to prevent fish from entering the irrigating channel, a trough positioned in front of said means to receive the fish that swim against said first mentioned means, means for returning said fish to the natural stream, a sand pipe communicating with the bottom of said trough, a gate for said sand pipe normally closing the communication between said trough and said sand pipe and adapted to be opened when it is desired to remove the sand or sediment that may collect in said trough, and a screen provided at the communication between said sand pipe and said trough to prevent fish from entering the sand pipe.

In testimony whereof, I have hereunto set my hand at Los Angeles, California, this 26th day of November, 1913.

ROBERT MATHESON.

In presence of—
JAMES R. TOWNSEND,
GUSTAV DREWS.

Copies of this patent may be obtained for five cents each, by addressing the "Commissioner of Patents, Washington, D. C."